Fig. 9

Patented Nov. 13, 1934

1,980,556

UNITED STATES PATENT OFFICE 1,980,556

PHOTOGRAPHIC SURVEYING APPARATUS

Viktor Sintich, Dresden-Weisser Hirsch, Germany

Application September 24, 1932, Serial No. 634,745
In Germany September 28, 1931

15 Claims. (Cl. 33—1)

My invention relates to photographic surveying apparatus.

It is an object of my invention to provide an improved apparatus of this type.

To this end, I provide a system of Cardanic members or rings on a suitable frame. The members are mounted to turn about a system of coordinates and to be tilted about axes which intersect in the origin of the system. From one of the Cardanic members I suspend a picture or plate holder and from another member I suspend a model of control points. A third member carries sighting means, such as a telescope, for observing the control points on the picture which is in the picture holder, and their reproduction on the model. The picture holder, the model of control points and the sighting means are universally movable with respect to each other.

By my invention, the photogrammetric basic problem of backward intersection in space is solved in a, comparatively speaking, very short time, and the economy of photogrammetric surveying is increased in proportion.

It is known that long and valuable time is wasted for adjusting the photographs in the modern and very expensive measuring machines, before mapping can be begun. With my apparatus, all external orientation points and elements are ascertained in a fraction of the time required heretofore, and the apparatus is much cheaper. The measuring machine is not employed so that I am able to scan a new picture, or pictures, while the measuring machine is still busy on the previous picture.

Another advantage is that with my apparatus I am able to ascertain the spatial coordinates of additional points.

Still another advantage is that the points for determining the position of the picture in the measuring machine which are required for correcting for tilt in pictures taken from aircraft, are fixed mechanically and not, as in the old systems, taken from maps or determined by tedious nadir, principal or focal-point triangulation.

The operation of my apparatus is quite independent of flat country and photographs taken vertically. By ascertaining any number of additional points on the photographs—which are readily returned to their initial positions—it is possible to provide the photographic maps, after correcting them for tilt, with altitude indications conveniently and economically.

Still another advantage is the possibility of a continuous mechanical compensation of the position data of series pictures which are variable in consequence of refraction and of the curvature of the earth, so that long distances can be bridged by small triangulation, without requiring trigonometric points.

The instruments which have been used for ascertaining the positions from which pictures were taken from aircraft, or for measuring the angles at the apex of the optical pyramid, were imperfect in that their models of the control points could not be oscillated in space together with the pyramid. By my novel apparatus, the position of the optical axis is reproduced spatially as required for the orientation of the pictures with respect to the three coordinates, and thereupon, without calculation, the coordinates of the region which has been photographed, the angles of inclination and diversion of the photographs, and the angle at which the camera was inclined, (determined by the line connecting the picture control point with the picture nadir) with respect to the north direction or picture azimuth, will be found.

With the object of attaining all these advantages, I provide in my apparatus, in combination with a frame, a system of Cardanic members which are mounted on the frame to turn about the origin of a system or coordinates and to be tilted about axes which intersect in the origin. I further provide a picture holder which is suspended from one of the Cardanic members, a model of the control points, i. e., points on the picture—normally three points—which correspond to points of the region shown on the picture, the model being suspended from another Cardanic member; and I still further provide sighting means which are carried by a third Cardanic member, for observing the control points on the picture and their reproduction on the model. The holder, the model, and the sighting means are universally movable with respect to each other.

My invention also relates to an auxiliary for fixing preliminarily the positions of the sighting means or telescope, without constructing the optical pyramid, and to another auxiliary for facilitating the sighting of additional points if the picture is in an unfavorable position.

In the accompanying drawings an apparatus embodying my invention is illustrated diagrammatically by way of example.

In the drawings

Fig. 5 is an elevation, Fig. 6 is a plan view, of the first-mentioned auxiliary, Fig. 7 is an elevation.

Figure 1:
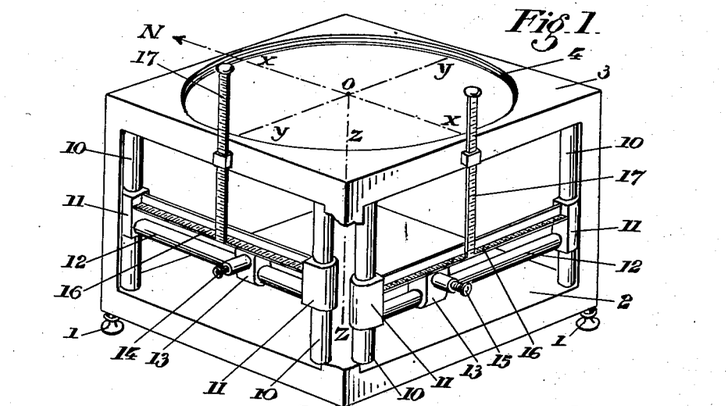
Fig. 1 is a perspective illustration of the frame of my apparatus with the coordinate-measuring and sighting means shown as telescopes, but without the Cardanic system.
Figure 2:
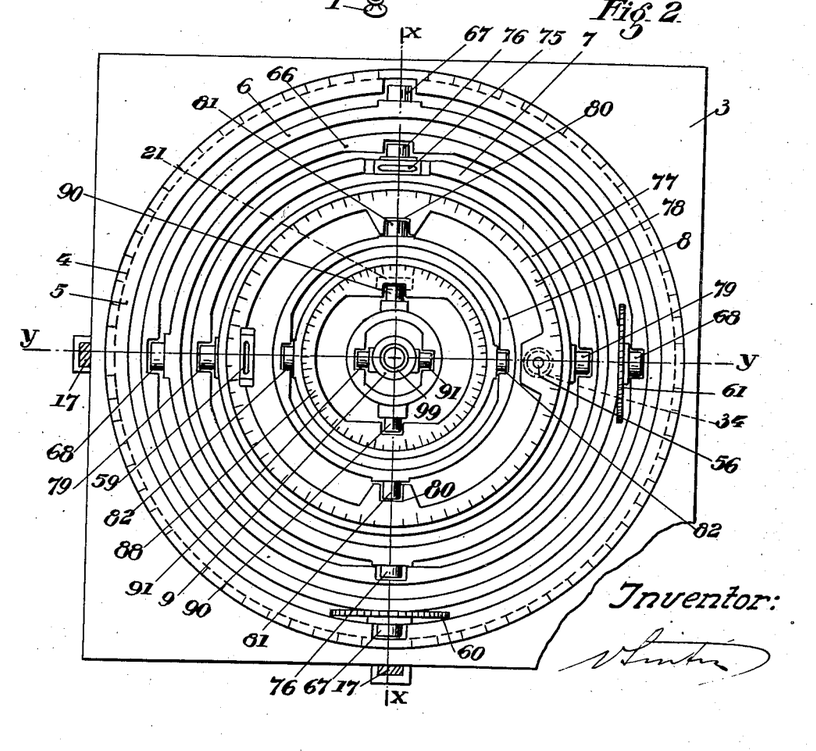
Fig. 2 is a plan view of the frame, showing the Cardanic system.

Referring now to the drawings, and first to Figs. 1 and 2, 1 is a frame which may be of metal and has the shape of a parallelepiped, with a plane base plate 2 and a top plate 3. The top plate 3 has a circular hole with a race 4 in which the Cardanic system is mounted to turn about the origin 0 of the coordinate system $x-x$, $y-y$, and $z-z$. The axis $x-x$ points toward north N.

The Cardanic system has four pairs of rings, 6, 66, 7, 77, 8, 88, and 9, 99. The outermost ring 6 has two diametrically opposite pins 67 for engaging in the race 4. 5 is a circular scale surrounding the race which may be turned and will be referred to as the "azimuth circle". It will be understood that the outermost ring 6 may be turned about the origin 0 in the race 4 and be tilted about its pins 67. The ring 66 of the first pair is pivoted to the ring 6 by pins 68 at right angles to the pins 67. Similarly, the rings 7 and 77 are connected to the ring 66 by pins 76, and to each other by pins 79, the rings 8 and 88 are connected to the ring 77 by pins 81, and to each other by pins 82, and the rings 9 and 99 are connected to the ring 88 by pins 90, and to each other by pins 91. Thus, the system has two axes at right angles to each other; one axis, which in Fig. 2 is shown in the plane of the coordinate axis $x-x$, contains the pins 67, 76, 81 and 90, and the other axis which is in the plane of the coordinate axis $y-y$ in Fig. 2, contains the pins 68, 79, 82 and 91.

The angle which the outermost ring 6 includes with the azimuth circle 5, is measured at an indicator 60, and the angle of the outermost ring and its inner ring 66 is measured at an indicator 61.

Figure 3:
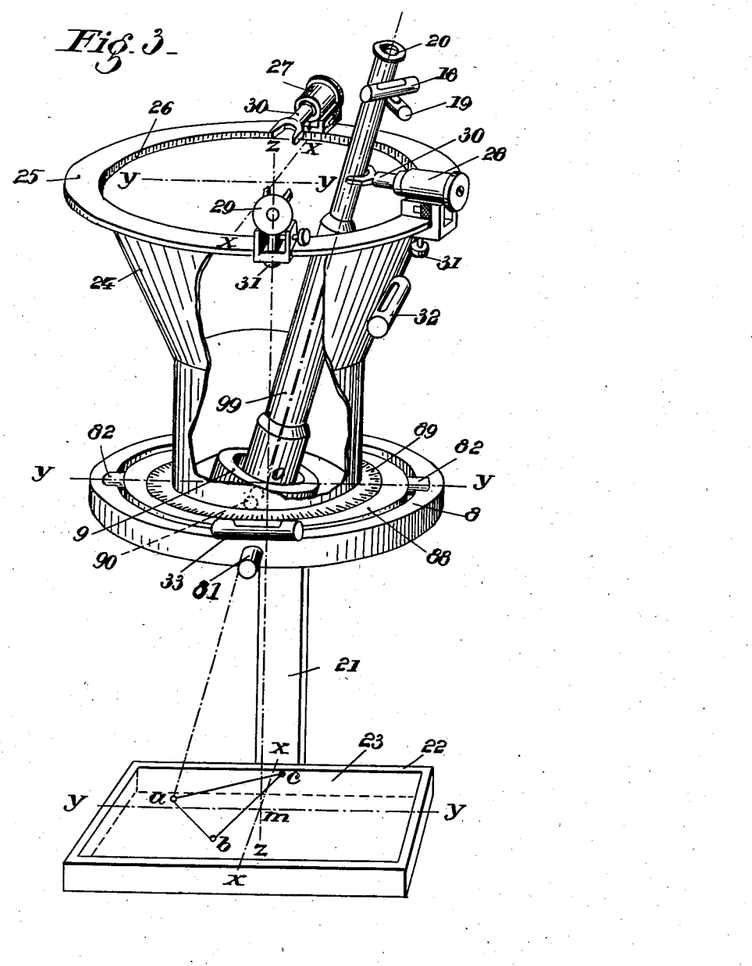
Fig. 3 is a detail, showing the picture holder and the sighting means, here shown as a telescope, for the control points.

The innermost ring 99 of the Cardanic system is the tube of a telescope, with the ocular 20, Fig. 3. Obviously, any other sighting device might be used instead of the telescope. The third pair of rings, 8, 88, supports the picture or plate holder 22, (Fig. 3) with the plate 23, by means of a rod 21 which holds the plate 23 at a distance from 0 which is equal to the focal length of the camera with which the photograph on the plate 23 was taken. The second pair of rings, 7, 77, supports the model of the control points, and the first or outermost pair, 6, 66, serves, after the fitting of the model to the optical pyramid, for setting the parts in the proper position together with respect to the spacial coordinates, and for reading the inclination and the edging of the plate 23.

The means for sighting on the control points to measure their coordinates, Fig. 1, include two pairs of vertical columns, each with a sleeve 11 mounted to slide thereon, and slide bars 12 connecting the sleeves of each pair of columns, slides 13 on the bars, one with a telescope or other sighting device 14, and the other with a similar device 15, horizontal scales 16 in parallel relation to the slide bars 12, and vertical scales 17 which move with the sleeves 11 and slide bars 12.

Referring now particularly to Fig. 3, the telescope 99 whose tube, as mentioned, is the innermost ring, is so supported that its axis is invariably in the origin 0. When the telescope is in its vertical position its axis coincides with the axis $z-z$ of the coordinate system. 18 and 19 are water-level gauges on the telescope 99 for ascertaining its vertical position. The inner ring 88 of the third pair is divided and has an annular insertion 89, for movement about an axis normal to the plane of said ring, together with a scale, which is mounted to turn in the ring 88 for determining the relative position of the two rings. The pins 90 of the outer ring 9 of the fourth pair are mounted in the insertion 89 and not directly in the ring 88. The rod 21 which spaces the plate 23 from the origin 0, is secured to the insertion 89. In its horizontal or initial position illustrated in Fig. 3, the plate 23 is positioned with its centre $m$ in the $z-z$ axis, and its axes X—X and Y—Y in the planes, respectively, of axes $x-x$ and $y-y$.

$a$, $b$, $c$ are the three control points on the plate 23 which show some points of the region photographed by one of the two cameras. As mentioned, the distance $0m$ is equal to the focal length of the camera.

Mounted on the scale insertion 89 is a tube 24 with a flange 25 at its upper flaring end. 26 is a scale on the inner edge of the flange, and 27, 28 and 29 are three brackets which are mounted to slide on the flange 25 while their position is read on the scale 26. Each bracket has a fork 30 which is mounted to slide therein and to be secured in any position with respect to the bracket by suitable means, not shown. 31 are screws on the brackets for holding them on the flange 25.

For sighting the points $a$, $b$, $c$ the telescope is turned about the origin 0 until its axis intersects one of the control points, and one of the brackets is displaced so that its fork 30 engages the telescope 99. Preferably, means such as springs are provided in the forks 30 for engaging the telescope tube. When the telescope has been pointed to one of the control points, Fig. 3 showing the position $Cz$ in which it is pointed at the control point $c$, it is focussed sharply and held in position by the corresponding fork bracket 28. In this manner the three positions of the telescope in which its axis coincides with the edges of the optical pyramid, are fixed once and for all and when the telescope is placed in one of the forks 30, it is properly pointed at one of the control points $a$, $b$, $c$. The horizontal position of the rings 8, 88 of the third pair is tested by a gauge 32 on the tube 24 and a gauge 33 on the outer ring 88 of the pair.

Means are provided at the pins of the third pair, preferably with coarse and fine adjustment, for tilting the telescope 99 into its vertical position in which its axis coincides with the axis $z-z$, and similar means are provided for turning the scale insertion 89, with the telescope and the plate holder, in the ring 88. These means are not shown because they are old in the art.

Figure 4:
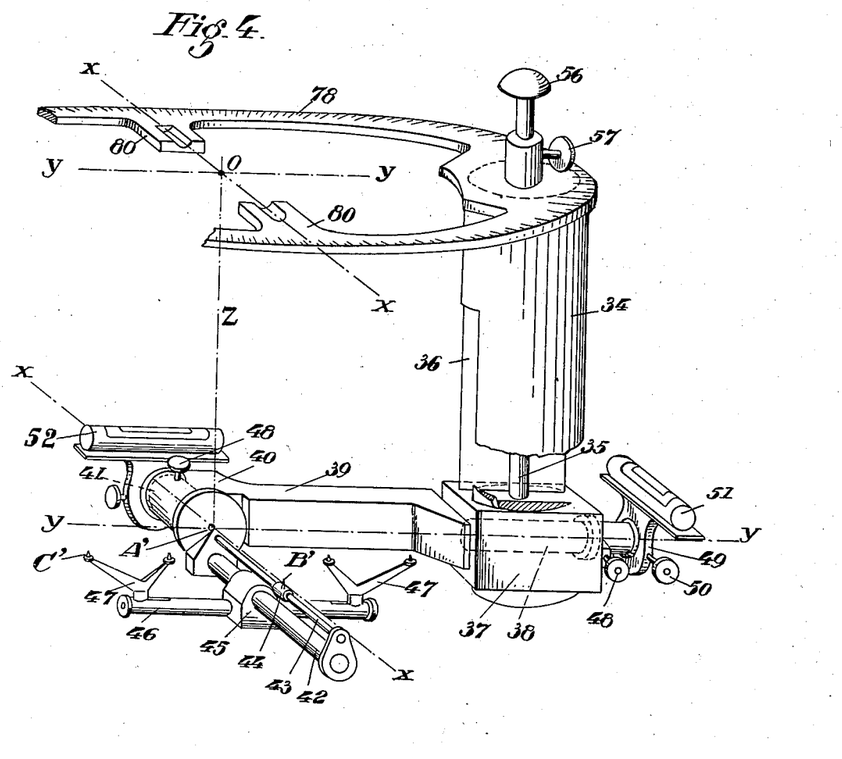
Fig. 4 is another detail showing the model of control points.

The second pair of Cardan rings 7, 77, also has an annular insertion 78 in its inner ring 77 for movement about an axis normal to the plane of said ring, together with a scale. This insertion supports the control-point model and is equipped with bearings 80 for the pins 81 of ring 8, as shown in Fig. 4.

Projecting downwards from the insertion 78 (Fig. 4), with its axis in the plane of the coordinate axis y—y, is a pillar 34, with a rod 35 mounted to slide therein. The pillar is slotted at 36 for the reception of a carriage 37 to which the lower end of rod 35 is connected. The segments at opposite sides of the slot 36 in the pillar 34 engage in corresponding holes in the carriage 37. Mounted to rotate in a bearing of the carriage, at right angles to the direction in which it is reciprocated, is a journal 38. The journal forms part of an arm 39 which at its free end has a bearing 40 for a journal 41 whose axis intersects the axis of the journal 38 at right angles in the axis z—z. In other words, the axis of the journal 41 is in the plane of the x—x axis, and the axis of the journal 38 is in the plane of the y—y axis. At the point of intersection, the journal 41 has a fine tapered point A'. Below the point A' two slide bars 42 and 43 extend in parallel relation to each other from the journal 41 in the plane of coordinate axis x—x. Mounted to slide on the upper bar 43 is a sleeve 44 with a point B' which is at the level of point A'. Mounted to slide on the lower bar 42 is a block 45 in which a rod 46 is mounted to slide at right angles to the movement of the block, and 47, 47 are two forks at opposite ends of the rod which have points C' at the level of points A' and B'. Means, not shown, are provided for fixing the sleeve 44 on the bar 43, and the block 45 on the bar 42.

The two points A' and B', and one of the four points C' which is moved into a corresponding position by displacing the rod 46, make up the model of the points A, B and C in the region, of which points a, b, c on the plate 23 are photographs. It will be understood that point A' of the model is invariably in the axis z—z, and point B' in the axis x—x, so that the line A'—B' of the model is in the plane of the axis x—x. The third point C' is at the right or the left of this plane, according to which of the four points on the forks 47 is used.

The arm 39 is set back from its journal 38 so as not to interfere with the fork 47 at the right of rod 46. Set screws 48 are provided for holding the journals 38 and 41 in position in their bearings. Holders 49, each with a set screw 50, are placed on tubular extensions of the rings for holding the journals 38 and 41 against axial displacement in their bearings, support a water-level gauge 51 for the journal 38, and 52 for the journal 41. The water-level gauges can be adjusted coarsely and finely by means which are not shown. The journals are turned in their bearings for adjusting the points of the model with respect to the horizontal plane through A', and the gauges 51 and 52 are adjusted after the adjustment of the points, so that they indicate the proper position of the points.

The rings 7, 77 are tilted like the rings 8, 88 which support the picture 23. When the rings are tilted and the insertion 78 is turned in the ring 77, the rings 8, 88 and the telescope 99 partake in the tilting and turning movements. The ring 77 has a water-level gauge 59, and the ring 7 has a gauge 75.

When the outermost ring 6 and the ring 66 are in their initial position, the indicators 60 and 61 are at zero. The inclination and edging of the plate at the end of the setting operation are read at the indicators. The inclination and edging are read at 60 and 61 when the operation is finished, by tilting the second to fourth pairs of rings in the first pair without varying the relative position of the rings in the tilted pairs, until the two gauges 51 and 52 of the model, Fig. 4, are in horizontal position. Tilting is effected by means for coarse and fine adjustment, not shown.

The object of the azimuth circle 5 is, after the fixing of the model A' B' C', to rotate all four pairs of Cardanic rings, with the parts connected thereto, until the sides of the triangle of control points a b c are in the proper position with respect to the axis x—x, or the north-south direction.

Figures 5, 6:
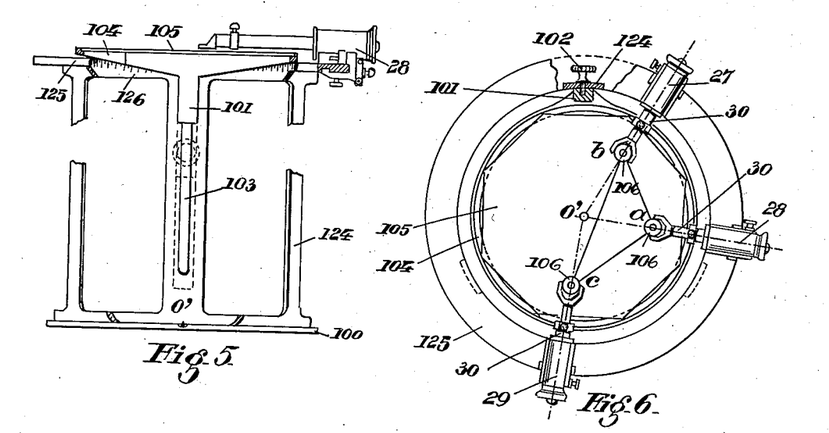

The auxiliary for the preparatory fixing of the telescope 99 will now be described with reference to Figs. 5 and 6. 124 is the frame of the instrument which is cut out in order to admit light to its interior. The frame corresponds to the casing 24 in Fig. 3 and has a flange 125 with a scale 126 for the reception of the three brackets 27, 28, 29, with their forks 30. The distance from the top of the flange 125 to the centre 0' of the base plate 100 of the instrument is equal to the distance from the top of the flange 25, casing 24, to the origin 0, Fig. 3.

Mounted to slide within the frame 124 is a bar 101 with a set screw 102 engaging in a slot 103 of the frame. 104 is a circular plate holder at the top of bar 101 and 105 is a glass plate in the holder 104 which may be octagonal as shown. The control points a b c are copied on the glass plate 105 and the glass plate is then placed in the holder 104, in inverted position with respect to the plate 23 in Fig. 3, and shifted by means of bar 101 until its distance from 0' is equal to the focal length of the camera. The forks 30 are inserted in the brackets (preferably a supply of forks is kept in stock from which forks of suitable length are selected), glass plates 106 marked at their centres are inserted in the forks, and the brackets 27, 28 and 29 are adjusted on the flange 125 until the mark on the glass plate 106 in every fork 30, one of the points a, b, c and the point 0' are aligned. The brackets 27, 28 and 29 on the flange 25 of casing 24 are now placed in the same positions as the brackets on the flange 125 with respect to their scale 126, and fixed by the set screws 31. The forks 30 are now removed from the brackets of the auxiliary and inserted in the brackets on the casing 24 in the same position as in the brackets of the auxiliary. If now the telescope is placed into the forks 30 instead of the glass plates 106, the control points a, b, c appear in the axis of the telescope, and any slight inaccuracy is readily corrected by fine adjustment of the brackets.

The auxiliary for facilitating the marking of additional points on the plate 23 will now be described with reference to Figs. 7 and 8. 130 is a heavy pedestal which is placed on the square base plate 2 (Fig. 1). 131 and 132 are two parallel vertical columns on the pedestal. 133 is a slide on the columns, and 134 and 135 are an upper and a lower horizontal arm on the slide. 136 is a pin which is adjustable on the upper arm, with a fine point 137 and a slidable protective sheath 139 for the point, and 138 is a point on the lower arm 135 which is vertically below the point 137 at a known distance d.

Figure 7:
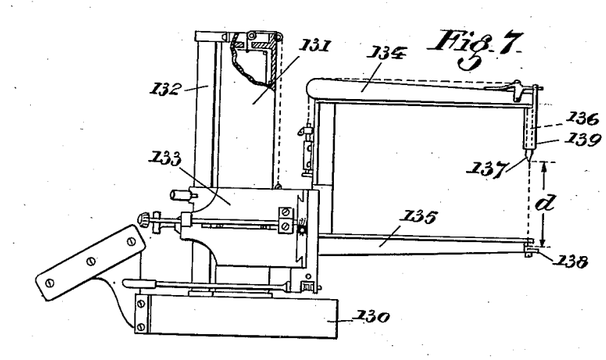
Figure 8:
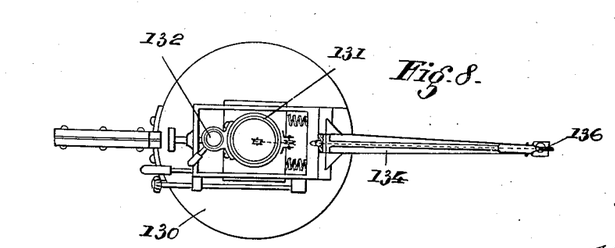
Fig. 8 is a plan view, of the second-mentioned auxiliary.

In operation, with the plate 23, for instance, in the inclined position shown in Fig. 7, the instrument is coarsely adjusted so that the point 137 is above the additional point to be marked. By lowering the arm 134 and by finely adjusting the pin 136, the point 137 is set quite exactly to the additional point on the plate 23. The coordinates in the plane of the $x$—$x$ and $y$—$y$ axes are found by sighting the point 138 with the telescopes 14 and 15, and the distance $a$ must be subtracted from the coordinate in the plane of the $z$—$z$ axis.

Figure 9:
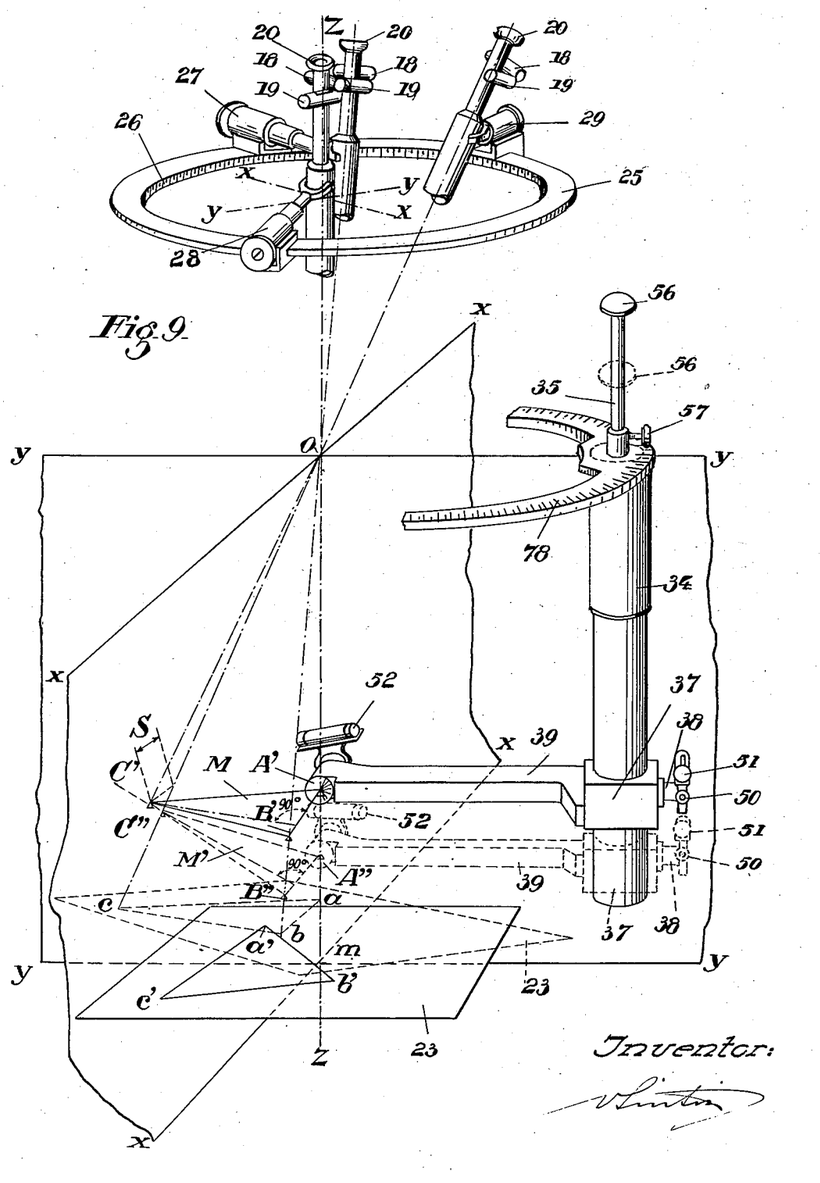
Figs. 9 and 10 are diagrams showing the operation of the apparatus.

The operation of my novel surveying apparatus is as follows:

First, the optical pyramid is established as shown in Fig. 9. The telescope 99 is aimed at the three control points $a\,b\,c$ in the manner described, with or without the auxiliary instrument, Figs. 5 and 6. The three edges $0a$, $0b$ and $0c$ of the optical pyramid, and the corresponding positions $Az$, $Bz$ and $Cz$ of the telescope 99, are shown in Fig. 9. Then the model $A'\,B'\,C'$ of the control points $a\,b\,c$ is set so as to copy the control points, as follows: The telescope 99 is turned until its axis coincides with the axis $z$—$z$ and the gauges 18 and 19 on the telescope are horizontal. The edge $0a$ of the optical pyramid now is in the $z$—$z$ axis and contains the point $A'$ of the model which is at M. While the telescope 99 is in its vertical position $z$—$z$, the plate 23 is inclined and edged until the side $a\,b$ of the triangle of control points is in the position $a'\,b'$ in which it is in the plane of the axis $x$—$x$. This is the plane in which the points $A'$ and $B'$ of the model are usually positioned, and the slide 44 (Fig. 4), with its point $B'$, is now in the edge $0b'$ of the optical pyramid. Now the operator must ascertain whether the point $C'$ of the model is also in the edge $0c'$ of the optical pyramid. It has been assumed that this is not so but that the point $C'$ is at the distance S from the edge $0c'$ which is ascertained by placing the telescope 99 into the edge $0c'$ with its optical axis, and sighting for the point $C'$. The model is now lowered into the position $M'$ in which its points are at $A''\,B''\,C''$. The line $A'\,B'$ is tilted in the plane of the $x$—$x$ axis until $B'$ strikes the edge $0a'$ at $B''$. When this position has been attained, the model is tilted about $A''\,B''$ until point $C'$ is at $C''$ in the edge $0c'$.

Figure 10:
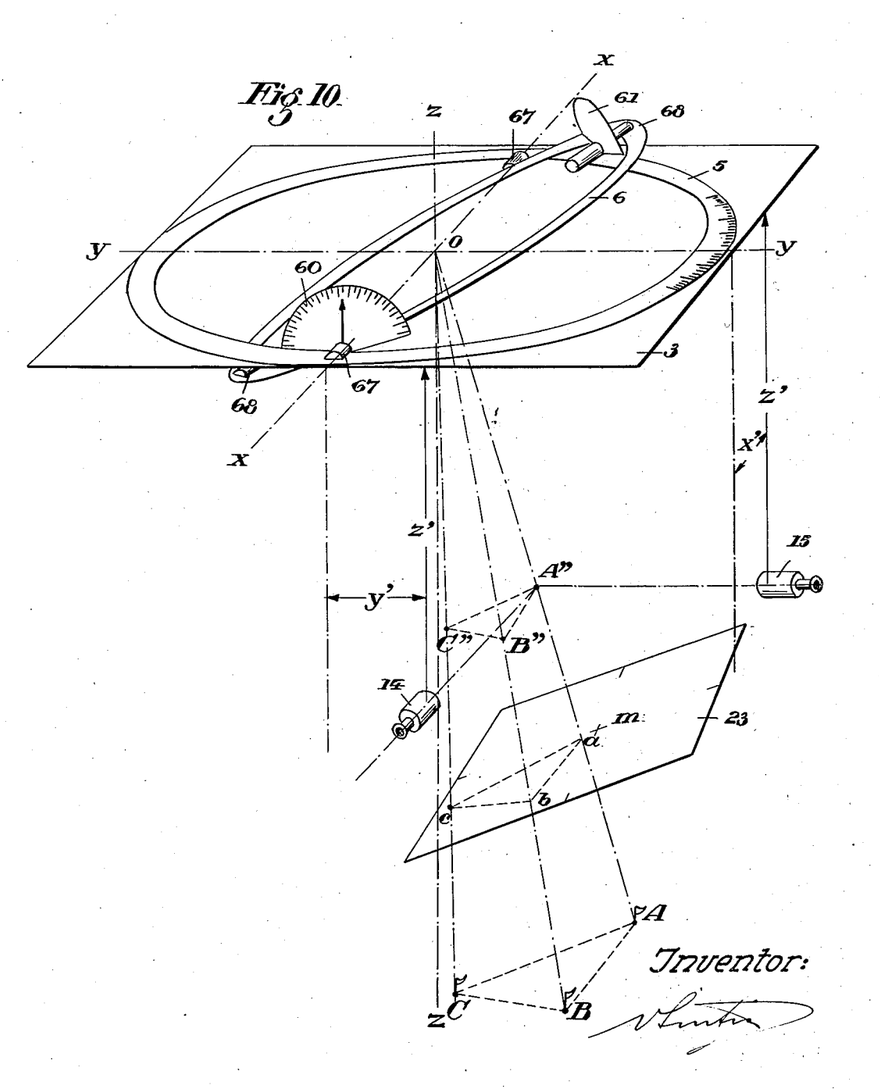

As it was necessary for the several adjustments described, to incline and to edge the plate 23, whose final position is shown in Fig. 10, the position of its centre $m$ and its axes $X$—$X$ and $Y$—$Y$ to the coordinate system have been altered, the proper position of the plate as in Fig. 3 must be reestablished. To this end, the insertion 89 of ring 88 to which the plate holder 22 is secured, is turned back through the same angle through which the side $a\,b$ was moved into the position $a'\,b'$, and the model is turned through the same angle, whereupon the system is tilted until the gauges 32 and 33, Fig. 3, are horizontal.

For ascertaining the inclination of the optical axis and the edging of the picture, the several rings of the Cardanic system are fixed in their relative positions and the first pair of rings 6, 66 are tilted until the two gauges 51 and 52 of the model are horizontal. Now the Cardanic system is turned without altering the relative position of its rings, by means of the azimuth circle 5, for orientation in the north-south direction. The turning is effected through the angle which the side $a\,b$ of the triangle of control points includes with the northwardly pointing axis $x$—$x$, minus the angle through which the plate 23 has been displaced.

The coordinates $x'$, $y'$ and $z'$ of one of the points of the model, say $C'$ are now measured by means of the telescopes 14 and 15 and the scales 17, as shown in Fig. 10. The inclination and edging of the plate 23 are read at 60 and 61.

I claim:

1. In a photographic surveying apparatus, a frame, a system of Cardanic members mounted on said frame to turn about the origin of a system of coordinates and to be tilted about axes intersecting in the origin, a picture holder suspended from one of said members, a model of control points suspended from another of said members, and sighting means carried by a third one of said members for observing the control points on the picture and their reproduction on the model, said holder, model and sighting means being universally movable with respect to each other.

2. In a photographic surveying apparatus, a frame, a system of Cardanic members mounted on said frame to turn about the origin of a system of coordinates and to be tilted about axes intersecting in the origin, a picture holder suspended from one of said members, a model of control points suspended from another of said members, sighting means carried by a third one of said members for observing the control points on the picture and their reproduction on the model, said holder, model and sighting means being universally movable with respect to each other, and means on said frame for measuring the coordinates of said control points related to said coordinate system.

3. In a photographic surveying apparatus, a frame, a system of Cardanic members mounted on said frame to turn about the origin of a system of coordinates and to be tilted about axes intersecting in the origin, a picture holder suspended from one of said members, a model of control points suspended from another of said members, sighting means carried by a third one of said members for observing the control points on the picture and their reproduction on the model, said holder, model and sighting means being universally movable with respect to each other, and a system of scales and telescopes on said frame for sighting on said control points to measure the coordinates of said control points related to said coordinate system.

4. In a photographic surveying apparatus, a frame having a circular race whose centre is in the origin of a system of coordinates, a system of Cardanic members mounted to turn in said race as a unit and to be tilted individually about axes intersecting in the origin, a picture holder suspended from one of said members, a model of control points suspended from another of said members, and sighting means carried by a third one of said members for observing the control points on the picture and their reproduction on the model, said holder, model and sighting means being universally movable with respect to each other.

5. In a photographic surveying apparatus, a frame, a system of Cardanic members mounted on said frame to turn about the origin of a system of coordinates and to be tilted about axes intersecting in the origin, a picture holder suspended from one of said members, a model of control points suspended from another of said members, sighting means carried by a third one of said members for observing the control points on the picture and their reproduction on the model, said holder, model and sighting means being universally movable with respect to each other, and adjustable brackets for holding said sighting means in the positions corresponding to the edges of the optical pyramid.

6. In a photographic surveying apparatus, a frame, a system of Cardanic members mounted on said frame to turn about the origin of a system of coordinates and to be tilted about axes intersecting in the origin, a picture holder suspended from one of said members, a model of control points suspended from another of said members, sighting means carried by a third one of said members for observing the control points on the picture and their reproduction on the model, said holder, model and sighting means being universally movable with respect to each other, and said sighting means being mounted to turn about said origin, a circular scale on one of said members surrounding said sighting means, brackets on said scale adjustable thereabout, and forks mounted to slide in said brackets for engaging said sighting means in the position corresponding to the edges of the optical pyramid.

7. In a photographic surveying apparatus, a frame, a system of Cardanic members mounted on said frame to turn about the origin of a system of coordinates and to be tilted about axes intersecting in the origin, an insertion in one of said members which insertion has a scale and is mounted for movement about an axis normal to the plane of the member, a picture holder suspended from said insertion, another insertion also having a scale and mounted in another of said members for movement about an axis normal to the plane of the other member, a model of control points suspended from the other insertion, and sighting means carried by a third one of said members for observing the control points on the picture and their reproduction on the model, said holder, model and sighting means being universally movable with respect to each other.

8. In a photographic surveying apparatus, a frame, a system of Cardanic members mounted on said frame to turn about the origin of a system of coordinates and to be tilted about axes intersecting in the origin, an insertion in one of said members which insertion has a scale and is mounted for movement about an axis normal to the plane of the member, a picture holder suspended from said insertion, a model of control points suspended from another of said members, sighting means carried by a third one of said members for observing the control points on the picture and their reproduction on the model, said holder, model and sighting means being universally movable with respect to each other, said sighting means being arranged within said insertion, a tube on said insertion surrounding said sighting means, a circular scale on said tube, brackets on said scale adjustable thereabout, and forks mounted to slide in said brackets for engaging said sighting means in the positions corresponding to the edges of the optical pyramid.

9. In a photographic surveying apparatus, a frame, a system of Cardanic members mounted on said frame to turn about the origin of a system of coordinates and to be tilted about axes intersecting in the origin, a picture holder suspended from one of said members, a model of control points suspended from another of said members, means for supporting the model points of said model to permit relative adjustment of said points with respect to each other and to the other member, and sighting means carried by a third one of said members for observing the control points on the picture and their reproduction on the model, said holder, model and sighting means being universally movable with respect to each other.

10. In a photographic surveying apparatus, a frame, a system of Cardanic members mounted on said frame to turn about the origin of a system of coordinates and to be tilted about axes intersecting in the origin, a picture holder suspended from one of said members, a model of control points, means including two journals at right angles to each other for suspending said model from said other member, said supporting means permitting relative adjustment of the model points with respect to each other and to the other member and holding one of the model points in the vertical coordinate axis of the system in all positions of the model, and sighting means carried by a third one of said members for observing the control points on the picture and their reproduction on the model, said holder, model and sighting means being universally movable with respect to each other.

11. In a photographic surveying apparatus, a frame, a system of Cardanic members mounted on said frame to turn about the origin of a system of coordinates and to be tilted about axes intersecting in the origin, a picture holder suspended from one of said members, a model of control points, one of the points of which is permanently positioned in the vertical axis of said coordinate system, while the second point is arranged to be displaced with respect to the first point in the plane of the $x-x$ axis of the coordinate system, and the third point is mounted to rock about the line connecting the first and second points; said model being suspended from another of said members, and sighting means carried by a third one of said members for observing the control points on the picture and their reproduction on the model, said holder, model and sighting means being universally movable with respect to each other.

12. In a photographic surveying apparatus, a frame, a system of Cardanic members mounted on said frame to turn about the origin of a system of coordinates and to be tilted about axes intersecting in the origin, a picture holder suspended from one of said members, a model of control points, means including two journals at right angles to each other for suspending said model from said other member, one of said journals supporting one of the points of said model permanently in the vertical coordinate axis of the system in all positions of the model, a bar extending from that one of said journals which supports the said point, supports for the other two points of the model which are displaceably mounted on said bar, and sighting means carried by a third one of said members for observing the control points on the picture and their reproduction on the model, said holder, model and sighting means being universally movable with respect to each other.

13. In a photographic surveying apparatus, a frame, a system of Cardanic members mounted on said frame to turn about the origin of a system of coordinates and to be tilted about axes intersecting in the origin, a picture holder suspended from one of said members, a model of control points, means including two journals at right angles to each other for suspending said model from said other member, one of said journals supporting one of the points of said model permanently in the vertical coordinate axis of the system in all positions of the model, a bar extending from that one of the journals which supports the said point, a support for the second point mounted to slide on said bar, a second bar adapted to be displaced at right angles to the first-mentioned bar, models for the third point at opposite ends of said last-mentioned bar, and sighting means carried by a third one of said members for observing the control points on the picture and their reproduction on the model, said holder, model and sighting means being universally movable with respect to each other.

14. In a photographic surveying apparatus, a frame, a system of Cardanic members mounted on said frame to turn about the origin of a system of coordinates and to be tilted about axes intersecting in the origin, means on said frame for ascertaining the position of one of said members with respect to the frame, means for ascertaining the position of two of said members with respect to each other, a picture holder suspended from one of said members, a model of control points suspended from another of said members, sighting means carried by a third one of said members for observing the control points on the picture and their reproduction on the model, and means for ascertaining the position of said sighting means with respect to the picture in said holder; said holder, model, and sighting means being universally movable with respect to each other.

15. In a photographic surveying apparatus, a frame, a system of Cardanic members mounted on said frame to turn about the origin of a system of coordinates and to be tilted about axes intersecting in the origin, a picture holder suspended from one of said members, means on the member from which the picture holder is suspended, for ascertaining the horizontal position of this member, a model of control points suspended from another of said members, means on the member from which the model of control points is suspended, for ascertaining the horizontal position of this member, sighting means carried by a third one of said members for observing the control points on the picture and their reproduction on the model, and means on said sighting means for ascertaining the vertical position of said sighting means; said holder, model and sighting means being universally movable with respect to each other.

VIKTOR SINTICH.